United States Patent [19]

Currie et al.

[11] Patent Number: 4,721,089
[45] Date of Patent: Jan. 26, 1988

[54] ADAPTIVE DILUTION CONTROL FOR IC ENGINE RESPONSIVE TO LPP

[75] Inventors: James H. Currie, Rochester; Kenneth J. Cinpinski, Sterling Heights; Kenneth J. Buslepp, Utica; Douglas K. Mehaffey, Troy; Edward J. Jensen, Rochester; Leroy E. Medendorp, Romeo, all of Mich.

[73] Assignee: General Motors Corporation, Detroit, Mich.

[21] Appl. No.: 24,296

[22] Filed: Mar. 10, 1987

[51] Int. Cl.$^4$ .............................................. F02M 25/06
[52] U.S. Cl. .................................... 123/571; 123/425; 123/435
[58] Field of Search ............... 123/425, 435, 568, 569, 123/571, 585; 364/431.06

[56] References Cited

U.S. PATENT DOCUMENTS

| | | | |
|---|---|---|---|
| 3,977,373 | 8/1976 | Sand | 123/425 |
| 4,314,534 | 2/1982 | Nakajima et al. | 123/571 X |
| 4,314,540 | 2/1982 | Ikeura | 123/571 |
| 4,315,492 | 2/1982 | Gardner | 123/571 |
| 4,481,925 | 11/1984 | Karau et al. | 123/435 X |
| 4,531,499 | 7/1985 | Eckart et al. | 123/571 |
| 4,561,401 | 12/1985 | Hata et al. | 123/435 X |
| 4,624,229 | 11/1986 | Matekunas | 123/425 |
| 4,679,536 | 7/1987 | Morita | 123/425 |

FOREIGN PATENT DOCUMENTS

0128962 7/1984 Japan .................................. 123/571

Primary Examiner—Willis R. Wolfe
Attorney, Agent, or Firm—Robert M. Sigler

[57] ABSTRACT

A dilution control adjusts an EGR valve, variable valve lift mechanism or similar dilution control device in an internal combustion engine in response to the relationship between ignition timing and the timing of peak combustion pressure (LPP) in the vicinity of a desired timing of peak combustion pressure (DLPP). The relationship is derived in the process of controlling ignition timing in response to LPP, wherein LPP is controlled to DLPP or as close to it as possible. In this process, LPP varies slightly back and forth through DLPP or through a maximum retard value, if LPP is not attainable. The apparatus detects whether LPP is retarded with respect to DLPP as it reverses from retard to advance, increases dilution if it is so retarded and decreases dilution if it is not. The engine thus operates with maximum EGR consistent with LPP being equal to the desired value DLPP.

9 Claims, 10 Drawing Figures

ADAPTIVE DILUTION CONTROL FOR IC ENGINE RESPONSIVE TO LPP

BACKGROUND OF THE INVENTION

This invention relates to dilution control for the combustible charge of an internal combustion engine to optimize engine operation.

The normal method of dilution control in the prior art is the open loop control of an EGR valve in response to sensed engine speed and load variables. Some dilution control systems have also been suggested in which the control is closed loop in response to a combustion pressure parameter. For example, the U.S. Pat. No. 3,977,373, to Sand issued Aug. 31, 1976, discloses that EGR may be varied in response to the value or magnitude of peak combustion pressure in order to maintain it within predetermined limits. U.S. Pat. No. 4,624,229 to Matekunas, issued Nov. 25, 1986, discloses an engine dilution control in which EGR is varied in response to a parameter derived from the final pressure ratio (of combustion pressure to motoring pressure) of an engine combustion event. U.S. Pat. No. 4,531,499 to Eckert et al, issued July 30, 1985, discloses an EGR control responsive to the variability of the amplitude of combustion pressure. However, these systems require a sensor or sensor system which will provide accurate, or at least consistent, values for the amplitude of peak combustion pressure; and such sensors are not necessarily available at a reasonable cost.

A sensor or sensing system for detecting the timing, rather than the amplitude, of peak combustion pressure is easier and less expensive to manufacture. Dilution is also related to the timing of peak combustion pressure, since it affects the rate of combustion. LPP ignition timing controls are known in the prior art. If some part of such an LPP ignition timing control were to indicate the direction to move for optimal dilution control it would be desirable to combine it with a dilution control to form a total engine control system. We have invented such a system.

SUMMARY OF THE INVENTION

The dilution control of this invention is for use in an internal combustion engine having a rotating crankshaft, a combustion chamber, means for providing a fuel charge of controllable dilution to the combustion chamber and means for igniting the fuel charge and sensing the timing, relative to a reference crankshaft rotational position, of the resulting peak combustion pressure. The dilution control comprises means effective to detect the relationship between the ignition timing and the timing of peak combustion pressure in the vicinity of a desired timing of peak combustion pressure and means effective to increase dilution if the detected relationship includes a timing of peak combustion pressure retarded with respect to the desired timing and to decrease dilution if it does not.

The first means mentioned in the preceding sentence may be effective to advance and retard the timing, relative to the reference crankshaft rotational position, of fuel charge ignition in response to the the timing of peak combustion pressure to maintain said timing of peak combustion pressure as closely as possible to a desired timing thereof, and detect if the resulting timing of peak combustion pressure is retarded with respect to the desired timing. In particular, the first means mentioned above may be effective to detect the reversal of movement of the timing of peak combustion pressure from retard to advance and further detect, at that moment, if such timing is retarded with respect to the desired timing.

Further details and advantages of this invention will be apparent from the accompanying drawings and following description of a preferred embodiment.

DESCRIPTION OF A PREFERRED EMBODIMENT

Figure 1:
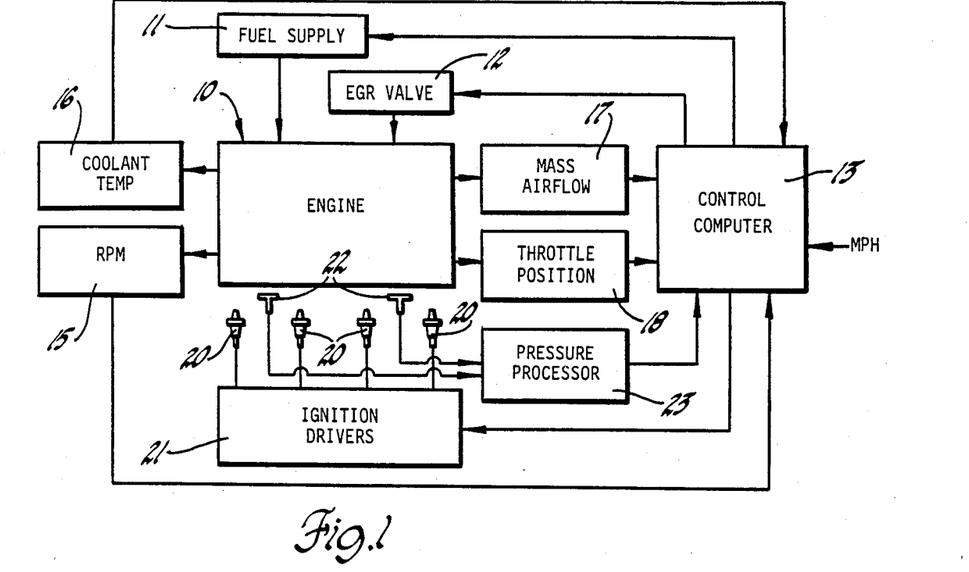
FIG. 1 shows a block diagram of an engine with a control according to this invention.

Referring to FIG. 1, an internal combustion engine 10 is of the standard type having a plurality of cylinders or combustion chambers. In this embodiment, there are four such cylinders, each provided with air and fuel through standard fuel supply apparatus 11. Fuel supply apparatus 11 comprises normal air intake apparatus including air cleaner, intake manifold, throttle valve and intake valves, and normal fuel injection apparatus including fuel injectors and injector drivers which are activated in response to timed, sequential signals from a control computer 13. The air and fuel forms a combustible fuel charge within the combustion chamber which has a composition controlled in the normal manner through the duration of the injector pulses relative to the mass of air in the cylinder and by dilution control apparatus. The air/fuel ratio control may be stoichiometric in response to a standard oxygen sensor in the exhaust system of engine 10.

The dilution control apparatus may include an exhaust gas recirculation (EGR) valve 12 to control the rate of inert exhaust gases FED back to the air supply apparatus. The degree of opening of EGR valve 12 is controlled through a range from closed to a maximum open by a stepper motor or equivalent means for accurate control of EGR flow, the stepper motor receiving positioning signals from computer 13. Other forms of dilution control apparatus may be used, either alternatively or in addition. For example, a variable lift adjusting device for the intake valves of engine 10 is described in U.S. Ser. No. 834,791, Variable Valve Lift/Timing Mechanism, filed Feb. 28, 1986 by Duane J. Bonvallet and issued on Jan. 27, 1987 is U.S. Pat. No. 4,638,773. This device, actuated by a stepper motor or other actuator means, will also be effective to controllably vary the dilution of the fuel charge within the associated combustion chamber.

Control computer 13 may be a standard digital microcomputer having a microprocessor, RAM, ROM, input/output apparatus and a clock and typified by a microcomputer of the Motorola (R) 6800 series. It includes, in ROM, a stored program for controlling fuel supply system 11, EGR valve 12 and an ignition system, to be described below, in response to values of engine operating parameters from a plurality of sensors. An engine speed (RPM) sensor 15 may be based on a 180 tooth wheel turning with the engine harmonic balancer and a magnetic or other pickup to generate electrical pulses as it is passed by teeth of the rotating wheel. Control computer 13 or other dedicated apparatus may measure the time between consecutive RPM pulses and generate an engine speed value therefrom. In addition, the counting of the RPM pulses can be used along with absolute crankshaft reference pulses from the standard distributor, not shown, of engine 10 to indicate absolute crankshaft rotational position at any time. If the arcs of the teeth and the spaces between the teeth are equal, a pulse can be generated every degree of crankshaft rotation. A coolant temperature sensor 16 of the normal type supplies a coolant temperature signal to computer 13. A mass airflow sensor 17 generates a signal of the mass air flow rate to the cylinders; and throttle position sensor 18 generates a throttle position signal, both said signals being provided to computer 13. Throttle position sensor 18 and coolant temperature sensor 16 are useful for controlling entry of the system into power enrichment and start/warmup operating modes, respectively.

Each cylinder of engine 10 is provided with a spark plug 20 effective, when fired, to initiate combustion of the combustible charge within the combustion chamber. Spark plugs 20 are fired by ignition drivers 21 in response to signals from computer 13. Spark plugs 20 and ignition drivers 21 may be of any standard type, with ignition drivers 21 responsive to firing pulses to fire spark plugs 20 and further effective to control the ignition dwell time.

Computer 13 includes stored lookup tables for fuel injection pulse width (combustion mixture air/fuel ratio), ignition timing and EGR valve opening (dilution). For all tables, the input lookup variables are speed and load, with speed being the output of the RPM sensor and load being a calculated value known as LV8, which equals mass air flow divided by RPM. Either of the first two tables may be in ROM or non-volatile RAM. In the first case, the cell contents are base values which may be modified by stored or calculated trim factors; in the second case, the cell contents may be periodically updated in an adaptive learning process so that no further trim is needed. The EGR table is in non-volatile RAM so that the cell contents may be changed in an adaptive learning process but remembered when the engine is shut down.

Combustion pressure sensors 22 are provided to sense the pressure within the cylinders of engine 10 and generate a signal thereof. The sensors may be of the engine headbolt type shown in the U.S. Pat. No. 4,491,010, to Brandt et al issued Jan. 1, 1985. If so, only two will probably be required for a four cylinder engine if placed between pairs of cylinders to be sensed as shown in FIG. 1, since they sense the combustion pressure induced strains between the engine block and head. Of course, any known sensor may be used, as long as its signal indicates clearly the magnitude of combustion pressure in the vicinity of the maximum or peak pressure. Absolute pressure sensors directly sensing combustion chamber pressure and piezoelectric force rings under spark plugs have been suggested, although each would require a separate sensor for each cylinder.

The output of the sensors is provided to a pressure signal processor 23 which detects the peak combustion pressure and signals its time of occurrence to computer 13, which, in turn, notes and stores the crankshaft angle (LPP) of its occurrence for further processing. Processor 23 may include any known circuit adapted to detect the maximum of an input signal, where the input signal is likely to have some significant high frequency noise making differentiating peak detection difficult without filtering. Some examples of apparatus capable of detecting the timing of true peak pressure may be seen in the U.S. Pat. No. 4,406,265, to Brandt et al issued Sept. 27, 1983, to Karau et al U.S. Pat. No. 4,481,925, issued Nov. 13, 1984 or to to Fattic et al. U.S. Pat. No. 4,601,197, issued July 22, 1986. In addition, processor 23 includes a digital microcomputer, which may be a separate coprocessor with computer 13 or 25 integrated in computer 13, which runs an LPP ignition control program such as that shown in U.S. Ser. No. 923,577, filed Oct. 27, 1986 by Kenneth J. Cinpinski, one of the inventors of this invention, and assigned to the assignee of this invention. For convenience, since this invention integrates closely with that program, a flow chart thereof is included as FIG. 5, to be described below.

Figure 2A:
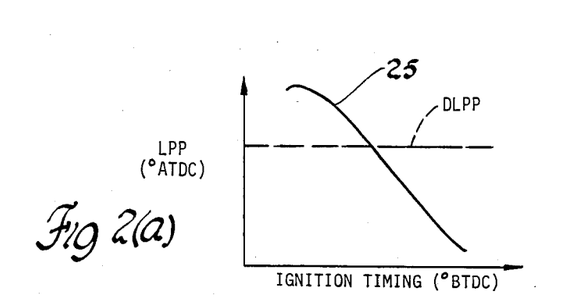
FIGS. 2(a)-2(c) show curves of LPP vs. ignition timing under three different engine operating conditions for and engine of the type shown in FIG. 1.
Figure 2B:
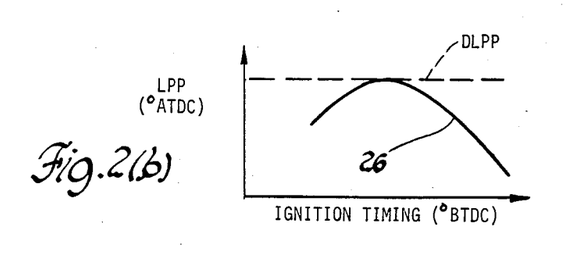
Figure 2C:
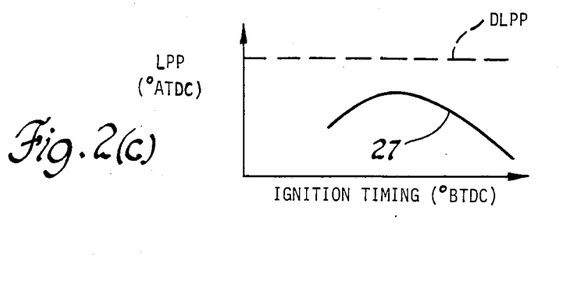
Figure 3A:
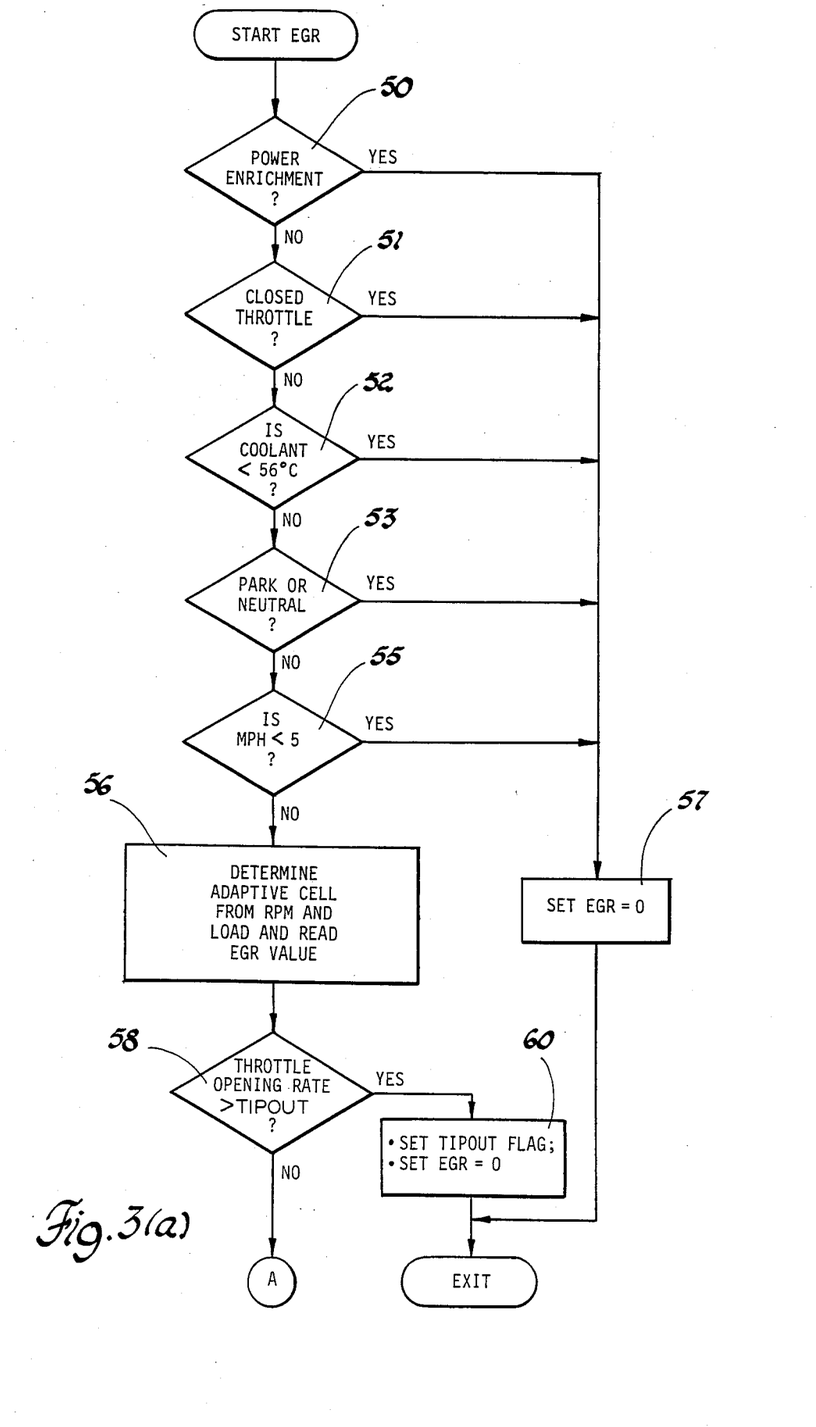
FIGS. 3(a)-3(c), 4, 5 and 6 show flow charts describing the operation of the control of this invention with the engine of FIG. 1.
Figure 3B:
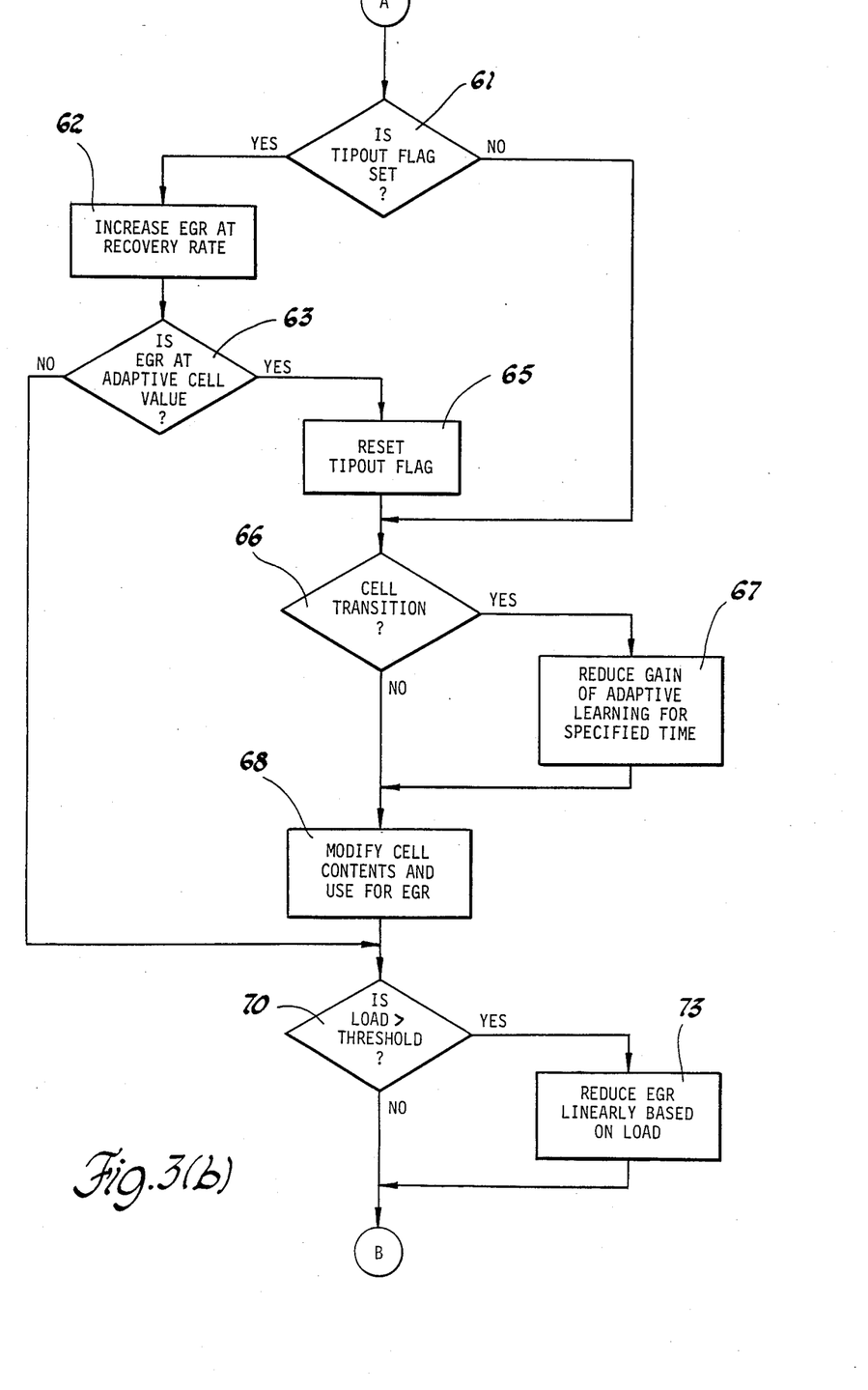
Figure 3C:
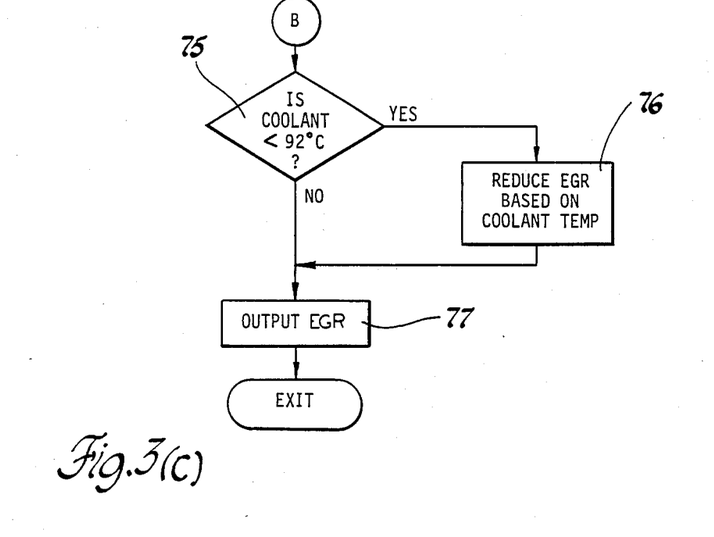
Figure 5:
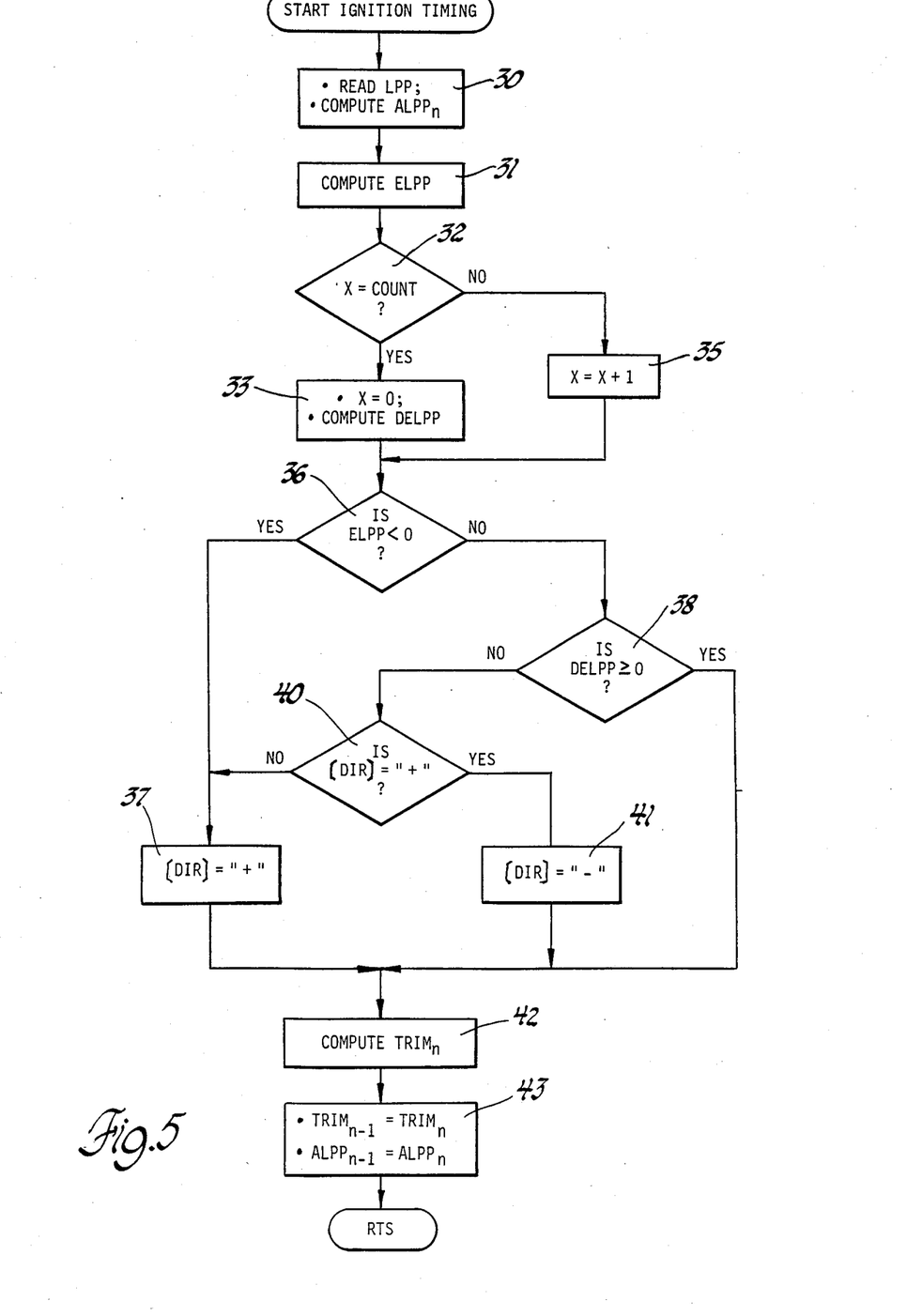

In order to fully understand the operation of the flow chart of FIG. 5, as well as this invention, as described in the flow charts of FIGS. 3(a)–3(c), the relationship of LPP, ignition timing and EGR must be understood. This relationship is demonstrated in the curves of FIGS. 2(a)–2(c), which will now be described. the curves show LPP, measured in crank angle degrees after top dead center (ATDC) vs. ignition timing, measured in crank angle degrees before top dead center (BTDC). Curve 25 of FIG. 2(a) shows a "well-behaved", almost linear curve intersecting the desired LPP value DLPP and having a slight foldover hook at its upper left end well removed from DLPP. Thus, LPP control is easy in the vicinity of DLPP, but EGR is not at its maximum allowable value.

As EGR is increased, curve 25 of FIG. 2(a) undergoes a change, with the foldover hook on the upper left enlarging and the left end of the curve falling, until it appears as curve 26 in FIG. 2(b). Curve 26 represents the upper limit of EGR that will permit DLPP to be obtained. Further increase of EGR results in curve 27 of FIG. 2(c), in which maximum attainable LPP is somewhat below DLPP. With respect to the LPP ignition control alone, curves 26 and 27 are difficult to maintain with a standard feedback type LPP ignition timing control, since the curve in the foldover regions has a slope opposite the slope in the other regions. This problem, however is solved by the method and apparatus represented by the flow chart of FIG. 5. From the standpoint of overall engine control, including EGR, it becomes clear that curve 26 may well be optimum, at least for a stoichiometric engine, since it maximizes EGR within the constraint of the maintenance of LPP at DLPP, which value is associated with good combustion at maximum efficiency. This invention provides the means for maintaining the relationship essentially as shown by curve 26 of FIG. 2(b), making use of some of the information determined in the LPP ignition control described in the flow chart of FIG. 5 to detect whether the curve, in the vicinity of its intersection with DLPP, goes above (more retarded than) DLPP.

The operation of the flow chart of FIG. 5 will now be described. It is assumed that computer 13 or other suitable apparatus has computed a standard or base ignition timing and stored it in a register or RAM memory location. It is also assumed that pressure processor 23 maintains a storage location for continually updated values of the average location of peak pressure, ALPP, which may be computed according to a standard digital lag filter equation from each new value of LPP derived therein. A typical first order lag filter equation will be of the form $ALPP_n = ALPP_{n-1} + G_1(LPP - ALPP_{n-1})$, wherein $ALPP_n$ is the new ALPP, $ALPP_{n-1}$ is the previously calculated ALPP, LPP is the latest input value of LPP and $G_1$ is a proportional gain factor. A first order filter is considered sufficient; however, those skilled in the art will be able to determine for themselves what filter equation to use according to their own requirements and to calibrate the gain constant $G_1$ upon testing a particular engine.

The flow chart of FIG. 5 assumes a number of defined quantities, each of which is provided a memory address in RAM for use in the subroutine. These quantities include:

LPP: the most recently read value of the location of peak combustion pressure;
$ALPP_n$: the new average LPP;
$ALPP_{n-1}$: the last average LPP;
DLPP: the desired ALPP;
DELPP: the difference between $ALPP_n$ and $ALPP_{n-COUNT}$;
ELPP: the error in ALPP or $DLPP - ALPP_n$;
$TRIM_n$: the new trim value;
$TRIM_{n-1}$: the previous trim value; and
[DIR]: a signed direction bit or flag used in the TRIM equation.

There is also a gain constant $G_2$ used in the TRIM equation, which is stored in ROM.

The flow chart of FIG. 5 begins at step 30 by reading the most recently input value of LPP and computing $ALPP_n$ as previously described. Next, at step 31, the apparatus computes $ELPP = DLPP - ALPP_n$. DLPP itself may be made to vary slightly with engine speed according to the equation $DLPP = 15 - (0.75\ RPM)/(1000)$, wherein RPM is the engine speed in revolutions per minute. At decision point 32 the apparatus checks to see if the value of a counter X equals a stored reference COUNT, which determines the frequency of updating DELPP. If so, in step 33 X is reset to zero to begin a new count; and the apparatus then computes $DELPP = ALPP_n - ALPP_{n-COUNT}$. If COUNT has not yet been reached at decision point 32, however, X is incremented at step 35; and step 33 is skipped. Clearly, if COUNT=1, then $DELPP = ALPP_n - ALPP_{n-1}$.

The new value of [DIR] is then computed in a number of decision points and steps. Since [DIR] is a two valued function ("+" or "−"), it is convenient to represent it as a single bit (1 or 0) in a flag memory location. At decision point 36, it is determined if ELPP is less than zero, which corresponds to ALPP being retarded with respect to DLPP. If so, [DIR] is assigned a value corresponding to "+" in step 37, which will advance ignition timing. If ELPP is not greater than zero, the flow chart proceeds to decision point 38, at which it is determined if $DELPP \geq = 0$, which corresponds to ALPP becoming more retarded. If so, [DIR] is unchanged from its previous value. If not, however, the apparatus reverses the value of [DIR] by asking, at decision point 40, if [DIR]="+" and changing it to [DIR]="−" in step 41 if the answer is yes or to [DIR]="+" in step 37 if the answer is no.

The value of [DIR] having been set, the apparatus next computes, in step 42, the new trim value, $TRIM_n = TRIM_{n-1} + [ELPP][DELPP][DIR]G_2$, wherein [ELPP] and [DELPP] are the absolute, unsigned values of those variables and [DIR] gives the sign to the quantity after the "+" sign and thus determines whether ignition timing is to become more or less advanced. The absolute value of ELPP is proportional to the error in ALPP; and the control is thus a proportional control. In addition, the absolute value of DELPP is proportional to the rate of change in ALPP, since it is proportional to the amount of such change in a reference time period (the period between successive trim determinations). In step 43, the old values $TRIM_{n-1}$ and $ALPP_{n-1}$ are replaced in memory by the new values $TRIM_n$ and $ALPP_n$, respectively, in preparation for the next TRIM determination.

In this way, the ignition timing trim is computed for application by computer 13 to the base ignition timing value for a final ignition timing output value, relative to TDC. In addition, however, certain information is stored for use by the EGR routine yet to be described. In particular, as the value of DELPP is computed in step 33, its sign is examined. If there has been a change of sign since the last computed value which indicates that the operating point on the curve has reached its peak of upward movement and started downward, a flag is set and some indication of the sign of ELPP, previously computed in step 31, is stored in memory for use by the flow chart of FIGS. 3(a)-3(c) below. In this way, the curve representing the present operating relationship among LPP, ignition timing and EGR may be characterized as one which does or does not cross the line representing DLPP as shown in FIGS. 2(a)-2(c).

The operation of the EGR control of this invention will now be described, beginning with the flow chart shown in FIG. 3(a). After the start, several conditions are checked to see if EGR is desired. If any of the conditions exist, EGR will be set to zero. A power enrichment flag is checked at decision point 50. If no power enrichment is found, a closed throttle flag is checked at decision point 51. If the throttle in not closed, the coolant temperature is checked at decision point 52. If the coolant temperature is not less than 56 degrees C., the transmission state is checked at decision point 53. If the transmission is not in park or neutral, vehicle speed MPH is checked at decision point 55. If MPH is less than 5, step 56 is reached, as described below. If any of these special conditions is present, however, no EGR is desired; and EGR is set equal to zero in step 57 with a following exit from the routine.

If none of these conditions are present, the proper adaptive cell of the EGR table is determined from the lookup values of RPM and LV8 (the load variable: mass air flow/RPM) and the EGR value read from the table and stored in a register or memory location. The table is a 5×6 lookup table in non-volatile RAM containing a total of 30 cells. Each value represents a stepper motor position and thus an EGR valve opening.

At decision point 58, throttle tipout is detected. Throttle tipout is the closing of the throttle valve at a predetermined rate TIPOUT, which is defined, in this embodiment, as greater than 3 percent in 100 milliseconds. Under this condition, intake manifold vacuum increases greatly and causes more exhaust gas to be recirculated through the valve for the same opening. To avoid a sudden excess of EGR in the combustion chamber, the EGR valve is closed during the tipout and allowed to recover afterward at a controlled rate. Therefore, if the throttle closing rate exceeds TIPOUT at decision point 58, a tipout flag is set and EGR is set to zero at step 60, after which the computer exits the routine.

If no throttle tipout is detected at decision point 58, the routine continues to decision point 61, shown in FIG. 3(b), in which the tipout flag is checked. If it is set, the system is in a recovery mode from a throttle tipout; and the EGR value, having previously been set to zero during the tipout itself, is increased in step 62 toward the normal table value for the speed and load conditions in a predetermined step which produces a recovery, over many cycles, at a controlled rate.

After step 62, the new EGR recovery value is compared at decision point 63 with the adaptive cell EGR value is checked to see if recovery is complete. If the new EGR recovery value is equal to or greater than the table value, then recovery is complete. Therefore, the tipout flag is reset at step 65. If recovery is not found to be complete at decision point 63, however, EGR will be left at the latest recovery value. Therefore the program skips to a point to be described below.

After step 65, or from decision point 61 if the tipout flag is not found to be set, it is determined at decision point 66 if a cell transition has occurred. If the engine operating conditions have changed sufficiently that the system has moved from one adaptive table cell to another, the gain of adaptive learning is reduced at step 67 for a predetermined time, as determined by a counting loop or a real time clock, before adaptive learning takes place at step 68. Adaptive learning is accomplished by changing the contents of the appropriate adaptive cell of the EGR table in response to a number left in a memory location by the LPP loop described in FIG. 4. A complete description of the process will be deferred to the discussion of that flow chart below; however, the gain refers to the size of correction made and, in fact, may preferably be zero. If no cell transition has occurred, step 67 is skipped.

From step 68, or from decision point 63 if the recovery EGR value has not reached the adaptive cell value, the apparatus next determines, at decision point 72, if the load value (LV8) is greater than a predetermined threshold. Specifically, it is convenient to make the threshold the lower boundary of the topmost row of cells in the EGR table. If so, the EGR value from the adaptive cell is reduced, at step 73, in a linear manner based on load. The adaptive cell value itself is not changed, only the value as output to the EGR valve. This provides finer control over EGR at the highest engine load levels. If load is not greater than the threshold, step 73 is skipped.

Next, coolant temperature is checked, at decision point 75, to see if it is less than a second reference temperature higher than the first: e.g. 92 degrees C. If it is less, the EGR value used is reduced at step 76 as a function of temperature, without changing the cell value. If not, however, step 76 is skipped. Finally, the EGR value that is left is output to the stepper motor driver circuitry to position EGR valve 12.

Figure 4:
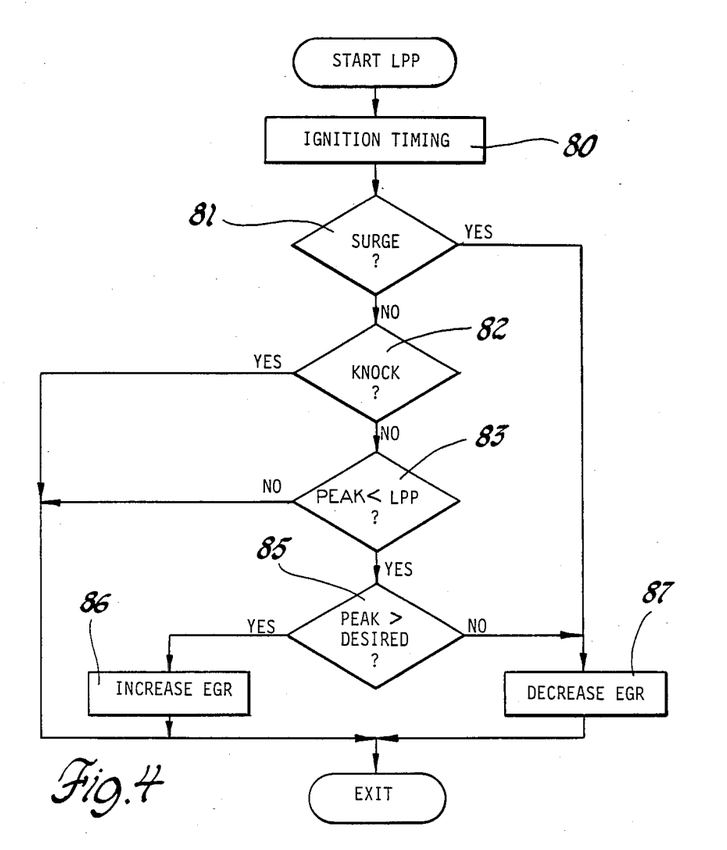

The LPP loop is described in the flow chart of FIG. 4. It begins at step 80 by determining ignition timing as previously described with reference to FIG. 5. Step 80 may be conveniently understood as a subroutine call to the flow chart of FIG. 5. Next, a surge flag is checked at decision point 81. The surge flag may be controlled by the surge subroutine described with reference to the flow chart of FIG. 6. If engine surge has not been detected, a knock flag is checked at decision point 82. The knock flag may be controlled by any conventional knock detecting system.

If no knock is detected, the peak LPP flag is checked at decision point 83. This flag was already described with reference to decision points 36 and 38 of FIG. 5, and will be set when LPP has reached a peak or maximum value as it responds to the LPP ignition control of FIG. 5. It is only when LPP is at a peak value that it can be determined if the peak is above or below DLPP. If LPP is not at a peak, or if knock is detected at decision point 82 above, the LPP flow chart is exited without any adaptive learning values left for the EGR routine, and no adaptive learning will take place.

If peak LPP is detected at decision point 83, it is determined at decision point 85 if the peak is greater than the desired LPP value DLPP. If so, then EGR can be increased; and, at step 86, a number to produce an incremental EGR increase is stored for reading by the EGR routine at step 68. If peak LPP is found not to be greater than DLPP at decision point 85, at step 87 a number to produce an incremental decrease in EGR is stored for reading by the EGR routine. The apparatus also proceeds to step 87 from decision point 81 if surge is detected, since a reduction in EGR generally tends to reduce surge. From either of steps 86 or 87, the apparatus exits the routine.

In order to detect surge, the normal RPM routine of computer 13 is modified slightly. As it detects the passage of teeth in the rotating toothed wheel of the RPM sensor 15, it normally reads the time of each tooth edge passing from a real time clock and calculates the time duration from the last tooth edge as well as counting tooth edges to monitor crankshaft rotational position. However, in addition, computer 13 stores the time of the tooth edge at 70 degrees BTDC and, when the tooth edge at 10 degrees BTDC is detected, stores its time and calls a surge subroutine as shown in flowchart form in FIG. 6.

Figure 6:
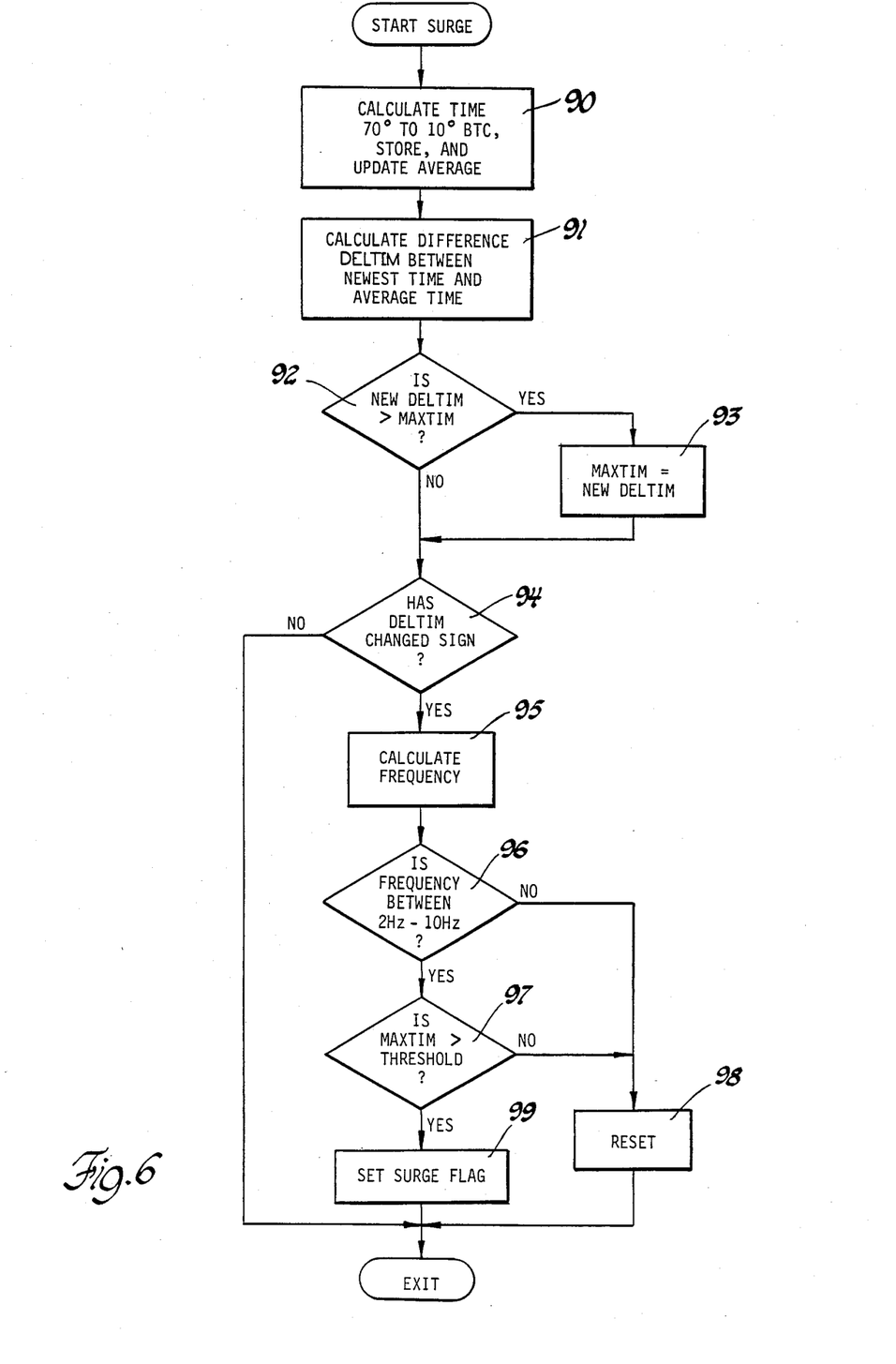

Referring to step 90 of FIG. 6, the apparatus calculates, from the stored times of the passage of 70 and 10 degrees BTDC, the time duration for the passage of that 60 degree crankshaft angle, stores that time and updates a running average of consecutive such times. At step 91, the difference DELTIM between the most recent time and the average time is calculated. If, at decision point 92, DELTIM is greater than a value MAXTIM, it replaces MAXTIM in memory at step 93. Otherwise, step 93 is skipped. Thus, MAXTIM will increase with DELTIM and remain at the maximum value as DELTIM decreases. If DELTIM has changed sign from the last calculated DELTIM value at decision point 94, the apparatus proceeds to step 95; otherwise it exits the surge subroutine. Thus, the half cycle points of DELTIM are detected.

At step 95, the frequency of DELTIM is calculated, by taking the difference between the latest stored 10 degree BTDC time and the similar time stored in memory at this step the last time it was reached in the subroutine. This frequency may also be calculated over a larger number of half cycles or averaged if desired. The new stored 10 degree BTDC time is then stored for use in this step the next time it is encountered.

If the frequency is found to be within the surge range of 2-10 Hz at decision point 96 and to be of sufficient amplitude, as determined by the value of MAXTIM, at decision point 97, then the surge flag is set at step 99 before the apparatus exits the subroutine. If either of these conditions is not met, then the surge flag is reset, MAXTIM is reset to zero, and the subroutine is exited.

The embodiments of the invention in which an exclusive property or privilege is claimed are defined as follows:

1. A dilution control for an internal combustion engine having a rotating crankshaft, a combustion chamber, means for providing a fuel charge of controllable dilution to the combustion chamber, means for igniting the fuel charge and sensing the timing, relative to a reference crankshaft rotational position, of the resulting peak combustion pressure comprising, in combination:
   means effective to detect the relationship between the ignition timing and the timing of peak combustion pressure in the vicinity of a desired timing of peak combustion pressure; and
   means effective to increase dilution if the detected relationship includes a timing of peak combustion pressure retarded with respect to the desired timing and to decrease dilution if it does not.

2. A dilution control for an internal combustion engine having a rotating crankshaft, a combustion chamber, means for providing a fuel charge of controllable dilution to the combustion chamber, means for igniting the fuel charge and sensing the timing, relative to a reference crankshaft rotational position, of the resulting peak combustion pressure comprising, in combination:
   first means effective to advance and retard the timing, relative to the reference crankshaft rotational position, of fuel charge ignition in response to the the timing of peak combustion pressure to maintain said timing of peak combustion pressure as closely as possible to a desired timing thereof, and detect if the resulting timing of peak combustion pressure is retarded with respect to the desired timing; and
   second means effective to increase dilution if the resulting timing of peak combustion pressure is retarded with respect to the desired timing and decrease dilution if it is not.

3. The dilution control of claim 2 in which the second means is effective to detect the reversal of movement of the timing of peak combustion pressure from retard to advance and further detect, at that moment, if such timing is retarded with respect to the desired timing.

4. The dilution control of claim 1 further comprising means effective to override the other means thereof and provide no dilution during the sensed existence of one or more of the following engine operating conditions:
   (a) power enrichment of the fuel charge;
   (b) closed throttle;
   (c) engine coolant temperature less than a temperature reference;
   (d) transmission in park or neutral;
   (e) vehicle speed less than an MPH reference;
   (f) throttle closing rate greater than a tipout reference.

5. The dilution control of claim 4 in which the means effective to provide no dilution during the sensed existence of throttle closing rate greater than a tipout reference is further effective, after the end of said throttle closing rate greater than a tipout reference, to limit the rate of dilution increase back to the dilution produced by the means of claim 1.

6. The dilution control of claim 1 in which:
   the means for providing a fuel charge of controllable dilution comprises (a) an EGR valve responsive to an EGR signal (b) a non-volatile memory comprising a plurality of look up cells addressed by predetermined engine speed and load parameters, and (c) means effective to sense engine operating conditions, derive therefrom the predetermined engine speed and load parameters, derive the EGR value from the appropriate look up cell and output the EGR value to the EGR valve; and
   the means effective to increase dilution and decrease dilution comprises means effective to change the appropriate look up cell by increasing or decreasing its contents by a first predetermined amount when no cell transition has occurred and by a second predetermined amount less than the first when a cell transition has occurred.

7. The dilution control of claim 1 further comprising:
   means effective to detect the time durations of a constant predetermined crankshaft rotational angle during the period of crankshaft deceleration before top dead center (BTDC) for each consecutively ignited combustion chamber, update and average time duration therewith and derive a difference between selected ones of said time durations detected by the first means and the average time duration;
   means effective to detect zero crossings and each new maximum value of said differences and generate a surge signal if the time beteen zero crossings corresponds to a predetermined frequency range of substantially 2 to 10 Hz and the maximum value of the differences within the zero crossings is greater than a predetermined reference; and
   means effective to decrease dilution from that derived from the timing of peak combustion pressure when a surge signal is generated and allow dilution to return to that derived from the timing of peak pressure in the absence of the surge signal.

8. A dilution control for an internal combustion engine having a rotating crankshaft, a combustion chamber, means for providing a fuel charge of controllable dilution to the combustion chamber, means for igniting the fuel charge and sensing the timing, relative to a reference crankshaft rotational position, of the resulting peak combustion pressure comprising, in combination:
   means effective to vary the timing of fuel charge ignition in response to the timing of peak combustion pressure in order to maintain the latter as close as possible to a predetermined desired timing, said means causing the timing of peak combustion pressure to repeatedly advance and retard through the predetermined desired timing or a maximum attainable retard on the advance side of the predetermined desired timing;
   means effective to detect if the timing of peak combustion pressure becomes retarded with respect to the predetermined desired timing as it repeatedly advances and retards; and
   means effective to increase dilution if the timing of peak combustion pressure does become so retarded with respect to the predetermined desired timing and decrease dilution if it does not.

9. The dilution control of claim 8 in which:
   the means effective to vary the timing of fuel charge ignition comprises (a) means for periodically sensing LPP in the combustion chamber and generating an average LPP value therefrom, (b) means for generating a DLPP value indicating a desired LPP, and (c) means responsive to both of the aforementioned means for periodically adjusting ignition timing (1) in the advance direction if the average LPP value is retarded with respect to the DLPP value, (2) in the same direction as the previous adjustment if the average LPP is advanced and becoming less advanced with respect to the DLPP value, or (3) in the opposite direction from that of the previous adjustment if the average LPP is advanced and becoming more advanced with respect to the DLPP value; and the means effective to detect if the timing of peak combustion pressure becomes retarded comprises (a) means effective to detect a change in the average LPP value in the advance direction and (b) means effective, when such a change is detected, to detect if the average LPP is retarded with respect to DLPP.

* * * * *